US008740699B1

(12) United States Patent
Muskin et al.

(10) Patent No.: US 8,740,699 B1
(45) Date of Patent: Jun. 3, 2014

(54) SLOT MACHINE WITH SLIDING SYMBOLS

(76) Inventors: Jon H Muskin, Philadelphia, PA (US); Stacy Friedman, Beaverton, OR (US)

( * ) Notice: Subject to any disclaimer, the term of this patent is extended or adjusted under 35 U.S.C. 154(b) by 0 days.

(21) Appl. No.: 12/716,285

(22) Filed: Mar. 3, 2010

Related U.S. Application Data

(63) Continuation of application No. 11/355,205, filed on Feb. 15, 2006, now Pat. No. 7,690,985.

(51) Int. Cl.
*A63F 13/00* (2014.01)

(52) U.S. Cl.
USPC .................... 463/31; 463/16; 463/20; 463/30

(58) Field of Classification Search
USPC .......................................... 463/16, 20, 30, 31
See application file for complete search history.

(56) References Cited

U.S. PATENT DOCUMENTS

| | | | | |
|---|---|---|---|---|
| 4,611,811 | A * | 9/1986 | Haase | 463/19 |
| 5,362,052 | A * | 11/1994 | Kubatsch | 273/145 R |
| 2003/0104855 | A1* | 6/2003 | McClintic | 463/16 |
| 2005/0054420 | A1* | 3/2005 | Cregan et al. | 463/20 |
| 2005/0090306 | A1 | 4/2005 | Seelig | |
| 2008/0139294 | A1 | 6/2008 | Inamura | |

* cited by examiner

*Primary Examiner* — James S McClellan
(74) *Attorney, Agent, or Firm* — Muskin & Farmer LLC

(57) ABSTRACT

A slot machine that has a bonus feature related to the "15 puzzle." An empty space symbol can appear, thereby allowing other symbols to slide around the matrix, creating different payout combinations. The symbols can slide around to create an optimal arrangement of the symbols, and then the player can be paid on paylines.

2 Claims, 17 Drawing Sheets

SLOT MACHINE WITH SLIDING SYMBOLS

CROSS REFERENCE TO RELATED APPLICATIONS

This application is a continuation application of application Ser. No. 11/355,205, filed on Feb. 15, 2006 now U.S. Pat. No. 7,690,985, now allowed, which is incorporated by reference herein in its entirety.

BACKGROUND OF THE INVENTION

1. Field of the Invention

The present invention is directed to a method, apparatus, and computer readable storage medium directed to a slot machine that can slide symbols into different positions.

2. Description of the Related Art

Slot machines are a billion dollar industry, both in the U.S. and around the world. Slot manufacturers are constantly seeking to improve their games with proprietary inventions, and these manufacturers can often derive substantial revenues if a proprietary game method becomes commercially successful.

What is needed is a method for awarding payouts to players which is new and entertaining for players.

SUMMARY OF THE INVENTION

It is an aspect of the present invention to provide an entertaining way to earn payouts.

The above aspects can be obtained by a method that includes (a) spinning slot reels to a first arrangement; (b) triggering a rearranging of symbols in the first arrangement; (c) rearranging symbols in the first configuration to form a second arrangement; and (d) awarding an award a payout based on the second arrangement.

The above aspects can also be obtained by a method that includes (a) providing slot reels with at least one empty slot symbol; (b) spinning the slot reels to a first arrangement of symbols; (c) if the first arrangement comprises an empty slot symbol, then performing: (d) determining a second arrangement of symbols; (e) sliding symbols in the first arrangement to form the second configuration, the symbols sliding using the empty slot symbol which itself moves after each symbol slides; and (f) awarding a player an award based on the second arrangement.

The above aspects can also be obtained by a method that includes (a) spinning slot reels to a first arrangement of symbols; (b) awarding a player an award based on the first arrangement of symbols; (c) if a slide trigger occurs, then performing: (d) sliding a first row or first column to a second arrangement, with a last symbol in the first row or first column transposed to an initial position in the first row or first column; and (e) awarding a player a second award based on the second arrangement.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
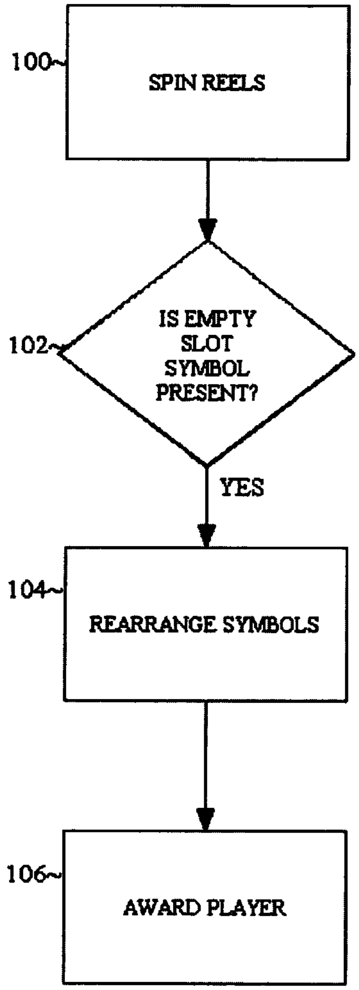
FIG. 1 is a flowchart illustrating an exemplary method to award a bonus payout, according to an embodiment.

Reference will now be made in detail to the presently preferred embodiments of the invention, examples of which are illustrated in the accompanying drawings, wherein like reference numerals refer to like elements throughout.

Slot machine games typically pay players for making winning combinations on paylines. They can also pay players a bonus round or payout, which can be an additional payout made to the player if a trigger condition allows for the bonus. For example, three bonus symbols can trigger a bonus round/payout, in which a player can earn additional money in various ways.

A "15 puzzle" is a puzzle in which a grid (e.g. 4×4) of movable pieces exists with a missing piece which allows other pieces to slide (see Eric W. Weisstein, "15 Puzzle." From MathWorld—A Wolfram Web Resource). The goal is to arrange the 15 pieces into a picture or a numerical order. Of course the puzzle can be made in other dimensions besides 4×4.

In an embodiment, a slot machine can have a feature related to the 15 puzzle. A slot machine can have symbols of any dimensions, e.g. 3×3, 4×4, 5×3, or any other known dimensions of slot machines. The symbols can be on vertical reels, horizontal reels, or spinning independent of any other symbols. An "empty slot" symbol can appear, which is a symbol indicative of an empty space (like the empty slot in the 15-puzzle). If the empty slot symbol appears, then the symbols can be rearranged (manually by the player or automatically) into a final configuration. All of the paylines on the final configuration can then be paid. The final configuration can be determined in a number of ways, such as the arrangement which would pay the player the most.

FIG. 1 is a flowchart illustrating an exemplary method to award a bonus payout, according to an embodiment.

The method can start with operation 100, which spins the reels on the machine. This operation may also including receiving a wager and receiving a button press by the player. These operations can all be conducted as known in the art.

From operation 100, after the reels are finished spinning, the method can proceed to operation 102, which determines an empty slot symbol is present. An empty slot symbol is a symbol which represents an "empty space," can graphically look like as such, and the presence of which can trigger a bonus round/payout. In reality, some machines predetermine all outcomes for each spin before outputting anything to the player, and thus any operation (and sub operations) described herein can be performed in any order. If an empty slot symbol is not present, then the method can proceed as known in the art, which would typically end and allow the player to play again.

If an empty slot symbol is present, then the method can proceed to operation 104, which rearranges the symbols. The symbols on the screen can be visually rearranged, like the 15-puzzle, since there is an "empty space." The rearrangement can take place using animation, sound, and some visual indication that the player has earned a bonus payout. This rearrangement operation will be discussed below in more detail.

From operation 104, the method can proceed to operation 106, which awards the player. The symbol arrangement after the rearrangement can then be paid according to the same (or different) payouts/paylines for a typical spin. The player can be paid twice, once after the initial spin (operation 100), and again in operation 106. Alternatively, a player who earns the bonus round may be paid just according to the rearrangement of symbols in operation 106.

Figure 2:
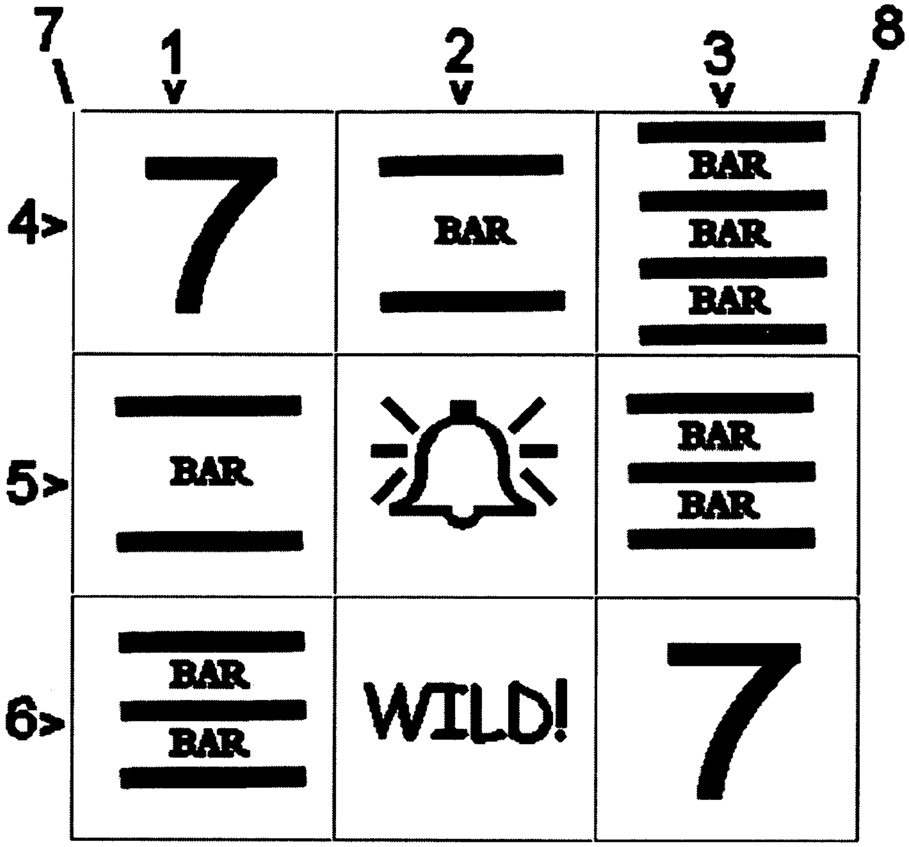
FIG. 2 is an exemplary slot game output, according to an embodiment.

FIG. 2 is an exemplary slot game output, according to an embodiment.

FIG. 2 illustrates a three by three reel game (although of course any other reel dimensions can be used) with 9 paylines (although of course any number of paylines can be used). The symbols can be identified on the top row, from left to right, as a,b,c; in the middle row, from left to right, as d,e,f; and in the bottom row, from left to right, as g,h,i. Thus payline 1 comprises symbols a,d,g (7, single bar, double bar), payline 2 comprises symbols b,e,h (single bar, bell, wild), payline 3 comprises symbols c,f,g (triple bar, double bar, 7), payline 4 comprises symbols a,b,c (7, single bar, triple bar), payline 5 comprises symbols d,e,f (single bar, bell, double bar), payline 6 comprises symbols g,h,i (double bar, wild, 7), payline 7 comprises symbols a,e,i (7, bell, 7), and payline 8 comprises symbols c,e,g (triple bar, bell, double bar). Of course any dimensions (e.g. 5×3 instead of 3×3) and any number of paylines and any known payline structure can be used as well.

Figure 3:
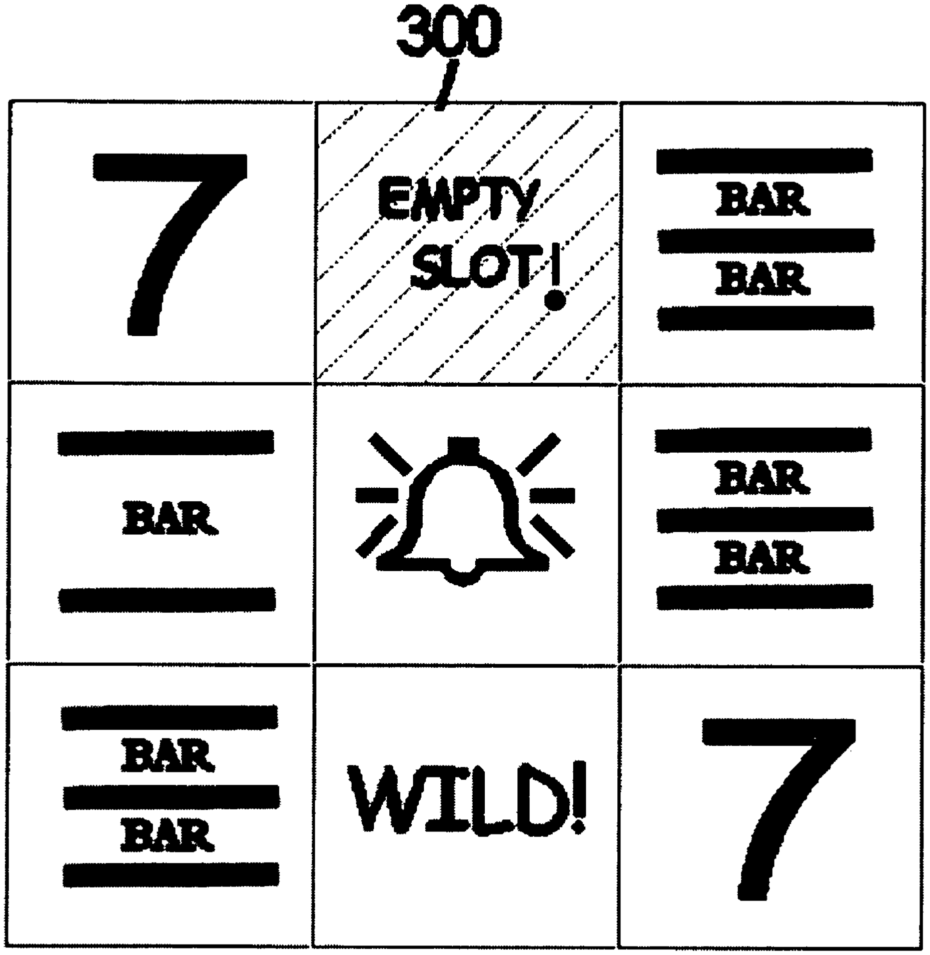
FIG. 3 is an exemplary slot game output with an empty slot symbol, according to an embodiment.

FIG. 3 is an exemplary slot game output with an empty slot symbol, according to an embodiment.

The configuration/output in FIG. 3 illustrates an empty slot symbol 300. The empty slot symbol can appear randomly, for example as any other symbol in the machine. The empty slot can also be handled separately, for example, for a particular probability, the empty slot symbol will appear. The empty slot symbol can appear in a particular reel or reels, a particular position, or anywhere. For example, the empty slot symbol may appear only on the center reel (or any other reel). Typically, the probability of getting an empty slot symbol (instead of only one there may also be more than one) should be small, as triggering the rearranging of symbols should be a rare occurrence in order to "tease" players to continue playing to enjoy this bonus.

Figure 4:
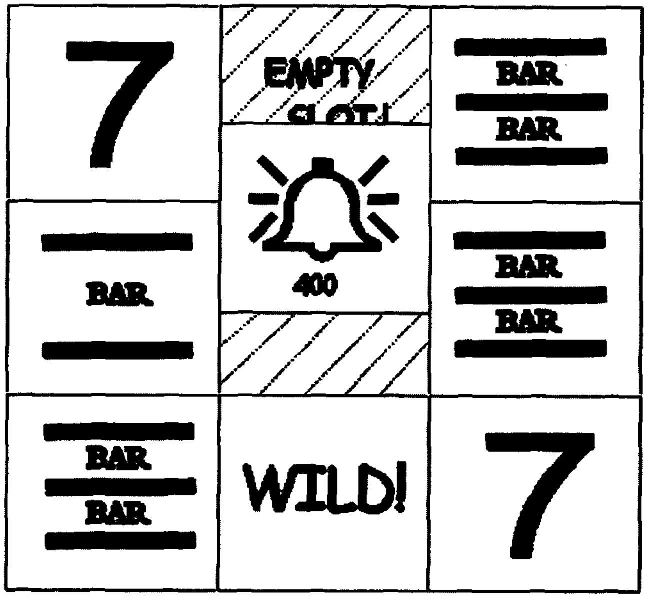
FIG. 4 is an exemplary slot game output with a sliding symbol, according to an embodiment.

FIG. 4 is an exemplary slot game output with a sliding symbol, according to an embodiment.

The bell symbol 400 is sliding from the middle position to the upper middle position. This sliding can be output using computer animation which is well known in the art.

Figure 5:
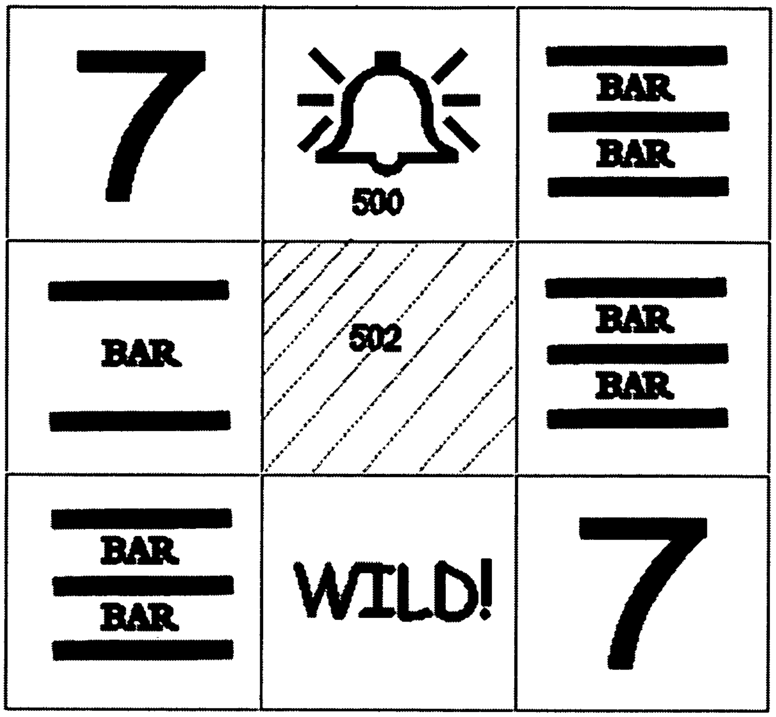
FIG. 5 is an exemplary slot game output with a slided symbol, according to an embodiment.

FIG. 5 is an exemplary slot game output with a slided symbol, according to an embodiment.

FIG. 5 is the final result of a sliding the bell symbol 500 from the middle position (see FIG. 3) to the top position. An empty slot symbol 502 has now switched from the upper middle position (see FIG. 3) to the middle position. This type of sliding of symbols can take place repeatedly, until a final arrangement of symbols is depicted. It is noted that typically, the machine knows the final arrangement of symbols and the sliding is merely done in order to entertain the player(s).

Figure 6:
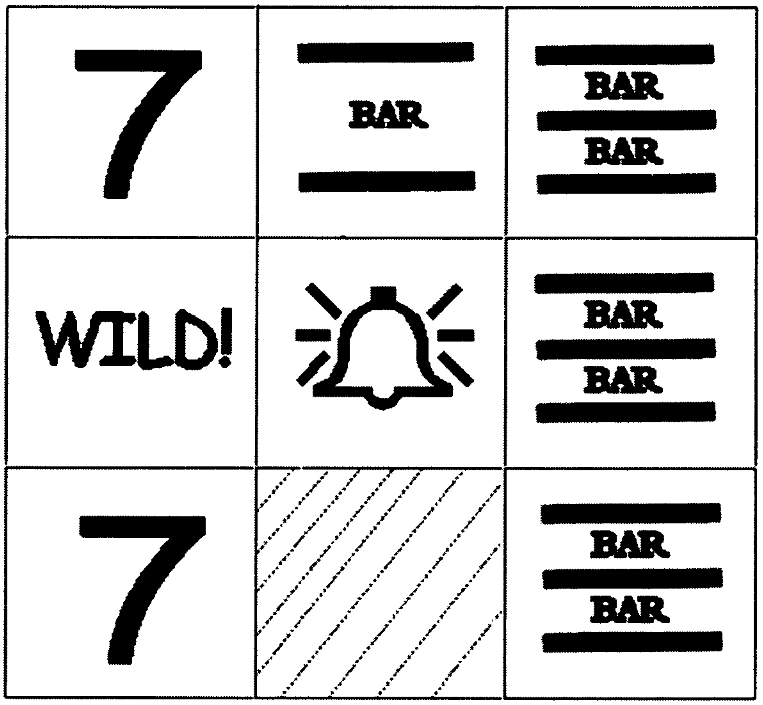
FIG. 6 is an exemplary slot game output with the symbols from FIG. 5 rearranged, according to an embodiment.

FIG. 6 is an exemplary slot game output with the symbols from FIG. 5 rearranged, according to an embodiment.

Consider for example that winning payouts from the machine depicted in FIGS. 2-5 are: 7/7/7; single bar/single bar/single bar; double bar/double bar/double bar; triple bar/triple bar/triple bar; and bell/bell/bell.

If FIG. 3 illustrates an initial arrangement of symbols, then the optimal way these symbols can be arranged in order to maximize payout to the player is illustrated in FIG. 6. Note that there are two winning combinations, 7/7/7 (line 1) and triple bar/triple bar/triple bar (line 3).

Note that there are other arrangements which would also pay the equivalent as illustrated in FIG. 6 as well. If the goal when rearranging symbols is to maximize payouts, and more than one payout equally maximizes the payout, then one of these arrangements can be chosen at random.

Figure 7:
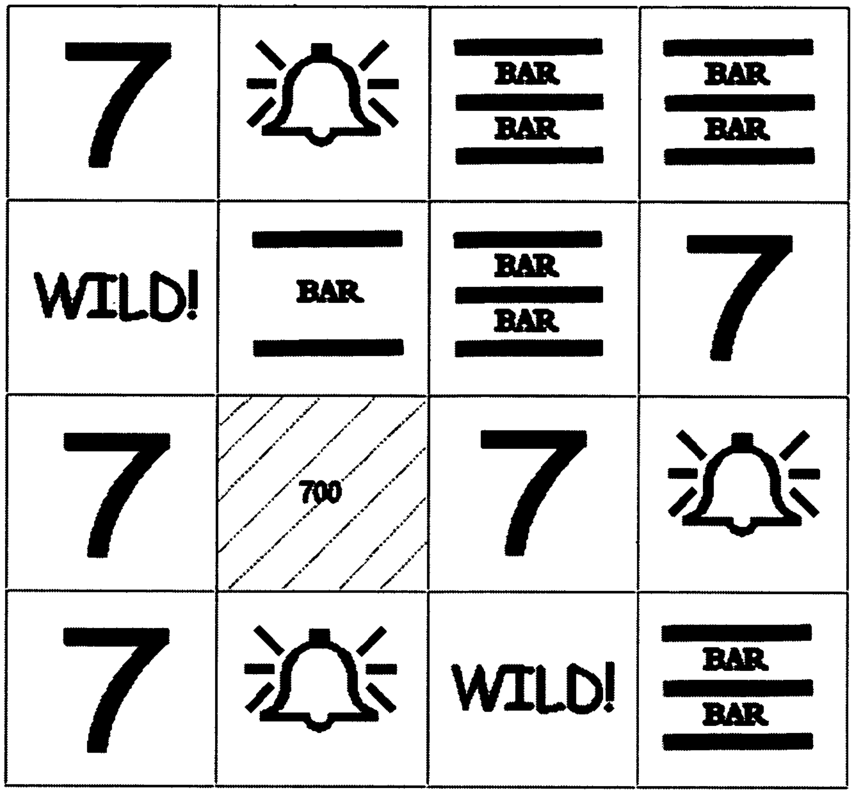
FIG. 7 is exemplary slot game output of a 4×4 slot game with an empty slot symbol, according to an embodiment.

FIG. 7 is exemplary slot game output of a 4×4 slot game with an empty slot symbol, according to an embodiment. Note the empty space symbol 700.

Figure 8:
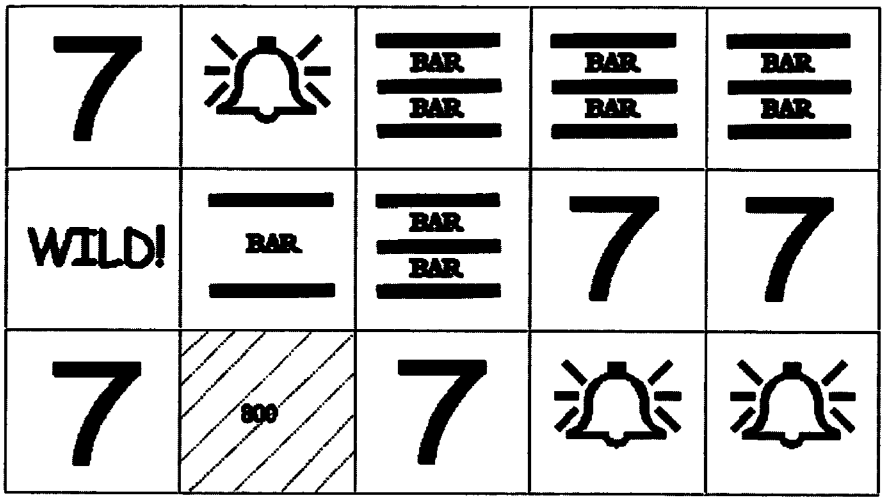
FIG. 8 is an exemplary slot game output of a 5×3 slot game with an empty slot symbol, according to an embodiment.

FIG. 8 is an exemplary slot game output of a 5×3 slot game with an empty slot symbol, according to an embodiment. Note the empty space symbol 800.

Figure 9:
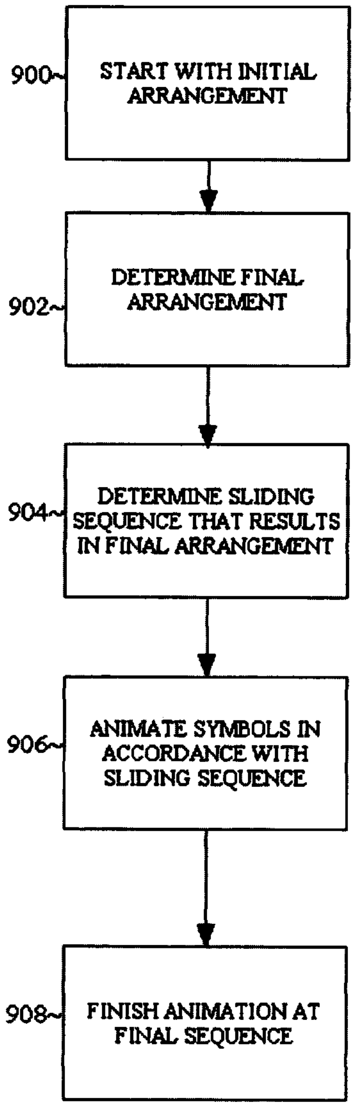
FIG. 9 is an exemplary flowchart illustrating rearrangement of symbols, according to an embodiment.

FIG. 9 is an exemplary flowchart illustrating rearrangement of symbols, according to an embodiment.

The method can start with operation 900, which starts with an initial arrangement. The initial arrangement is typically the result of a regular spin, and can be determined as known in the art.

From operation 900, the method can proceed to operation 902, which determines a final arrangement. The final arrangement comprises all of the symbols in the initial arrangement rearranged. While typically all of the symbols from the initial arrangement are used in the final arrangement, in an embodiment it is possible that a final arrangement may have one or more symbols that are different than the initial arrangement.

Typically, the final arrangement will be an arrangement of symbols in the initial arrangement that would maximize the payout. Either all of the paylines covering the final arrangement can be active, or only the paylines that were active for the initial arrangement (the original spin). Other final arrangement criteria can be used as well, for example the final arrangement can just be a random rearrangement of the initial arrangement, or some other set of rules.

It is also noted that some final arrangements may not be possible to arrive at from the initial arrangement. The final arrangement can be chosen to be the maximum payout that can be slided into from the initial arrangement. Thus, in some situations, a higher paying arrangement(s) may have to be discarded as unobtainable.

More on determining the final arrangement will be discussed below in more detail.

From operation 902, the method can proceed to operation 904, which determines the sliding sequence that results in the final arrangement.

The solution to the 15-puzzle, and its variants, are well known in the art. For example, given an initial state, and a desired state, the steps to reach the desired state can be computed. For more information, see entries and links in Wikipedia for "15 puzzle" or using Google.

From operation 904, the method can proceed to operation 906, which animates the symbols in accordance with the sliding sequence determined in operation 904.

From operation 906, the method can proceed to operation 908, which finishes the animation at the final arrangement. The winning combinations therein can be identified on respective paylines, and the player can then be awarded for them.

Figure 10:
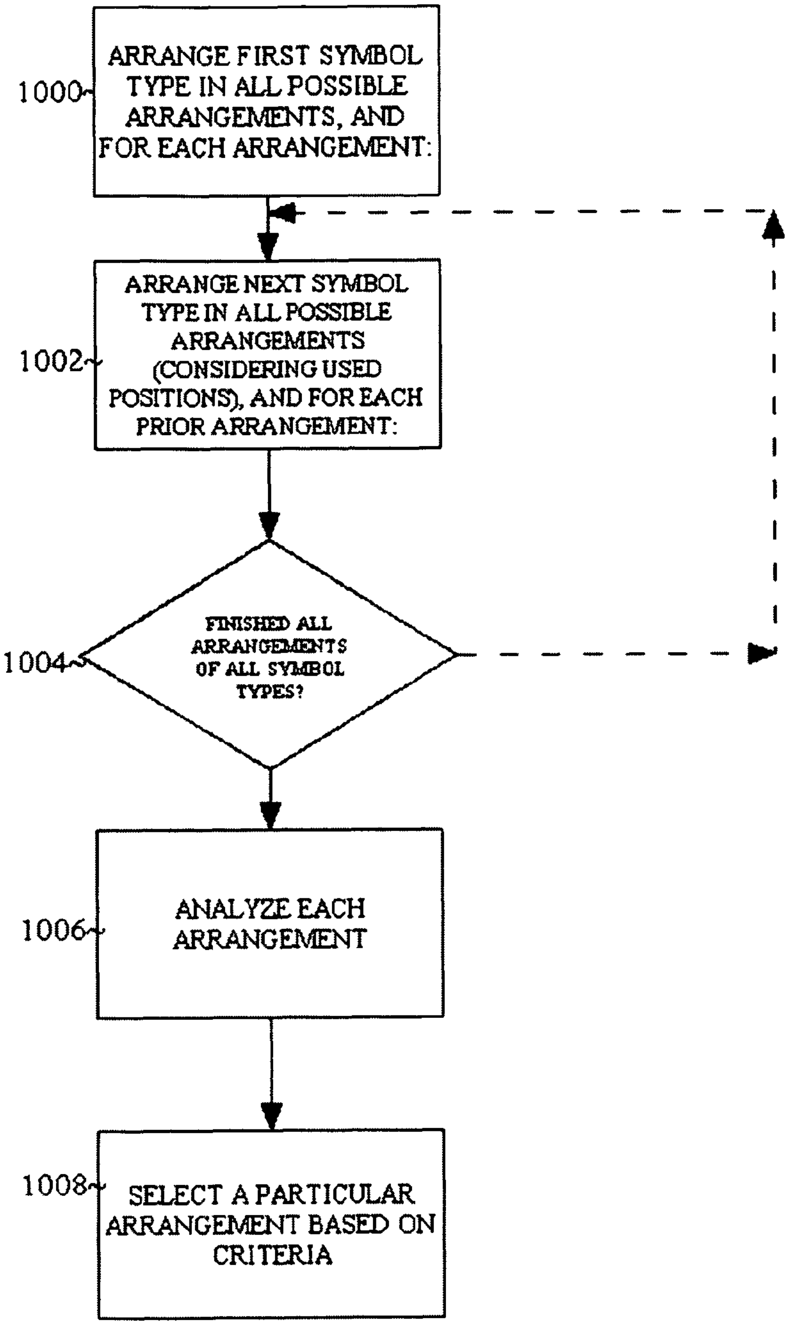
FIG. 10 is an exemplary flowchart illustrating a method of determining a final arrangement of slot symbols, according to an embodiment.

FIG. 10 is an exemplary flowchart illustrating a method of determining a final arrangement of slot symbols, according to an embodiment. This can for example implement operation 904 of FIG. 9.

When an initial arrangement of symbols is to be rearranged (e.g. an "empty slot" symbol appears or another trigger), then the computer implementing the method should typically determine what the final arrangement of symbols is going to be before the rearranging actually starts on an output device.

FIG. 10 is an exemplary flowchart illustrating a method of determining a final arrangement of slot symbols, according to an embodiment.

The method can begin with operation 1000, which can arrange a first symbol type in all possible arrangements, and for each arrangement can iteratively perform the further operations as described herein. For example, a first symbol type can be placed in all possible arrangements on the playing field. For each arrangement of first symbols, further symbols can be arranged in each respective arrangement.

From operation 1000, the method can proceed to operation 1002, which can arrange the next symbol type in all possible arrangements considering used positions, and for each prior arrangement, can perform further operations as described herein.

From operation 1002, the method can proceed to operation 1004, which checks if it is finished all arrangements of all symbol types.

If the check in operation 1004 determines that the method is not finished, then the method can return to operation 1002 which can continue arranging symbol types.

If the check in operation 1004 determines that the method is finished, then the method can proceed to operation 1006, which analyzes each arrangement. The payout of each arrangement can be determined using the paylines that were paid for when the reels were originally spun.

From operation 1006, the method can proceed to operation 1008, which selects a particular arrangement using the analysis performed during operations 1006 according to criteria. Criteria can be, for example, the arrangement of symbols with the highest payout A criteria can also, be for example, an arrangement of symbols that has a higher payout than the original arrangement before rearranging the symbols. Since many different arrangements can be possible, one that fits can be chosen at random.

It is noted that the operations in FIG. 10 can be performed in any order. For example, the analyzing (operation 1006) can be performed when each arrangement of symbols has been placed (operation 1002). In addition, only the best arrangement may be noted (e.g. the one with the highest payout), so that after all arrangements have been considered, the one that is the highest one can be considered the best arrangement. If multiple arrangements can produce a same highest payout, then one can be chosen at random.

In an alternative embodiment, an empty slot symbol may not be required. A rearrangement symbol can appear at random. A rearrangement symbol can be a symbol that can say "rearrange!" or similar implication and can trigger a rearrangement of symbols. Symbols can be visually rearranged in numerous ways. For example, the initial arrangement can dissolve and be replaced with a second arrangement. Any of the embodiments described herein to determine the second arrangement can be used in this embodiment as well.

The rearrangement symbol, like the empty slot symbol can for example be on one stop on a single reel (or multiple stops on one or more reels). The second arrangement can contain all of the symbols that were present in the first arrangement, or alternatively all of the symbols in the first arrangement need not be present in the second arrangement. For example, the rearrangement symbol itself may be replaced with a random symbol in the second arrangement.

A simple example will be presented to illustrate the operations of FIG. 10. A 2 by 2 slot machine has two symbols A and B. The symbol 'E' will be used to designate an empty slot symbol and the symbol 'U' will be used to designate a slot position that has not yet been assigned.

Consider the 2×2 machine which is spun and results in an initial arrangement of 'AA' on the top row and 'BE' on the bottom row. The number of ways W to arrange a first symbol on the board is given by the formula:

$$W = \text{number of unassigned squares on board}!/(\text{number of current symbols}!*(\text{number of unassigned squares on board} - \text{number of current symbols})!)$$

Thus, for four squares on the board (2*2) and two A symbols (the current symbol being placed), W=4!/(2!*2!)=6. Thus, there are six ways to arrange the A symbols. Table I below illustrates the six ways to arrange the A symbols (in no particular order).

TABLE I

| |
|---|
| 1: |
| AA<br>UU |
| 2: |
| AU<br>AU |
| 3: |
| AU<br>UA |
| 4: |
| UU<br>AA |
| 5: |
| UA<br>UA |

TABLE I-continued

| 6: |
| --- |
| UA |
| AU |

Each configuration in Table I has two unassigned squares. Thus, using the above formula to compute W, W=2!/(1!1!)=2. Thus, there are two ways to place the one B symbol (the current symbol) for each situation in Table I. These can be placed in sequential order (or any other type of order). Table II illustrates the placement of B for each situation in Table I, each of the two placements labeled (a) and (b).

TABLE II

| 1(a) | 1(b) |
| --- | --- |
| AA | AA |
| BU | UB |
| 2(a) | 2(b) |
| AB | AU |
| AU | AB |
| 3(a) | 3(b) |
| AB | AU |
| UA | BA |
| 4(a) | 4(b) |
| BU | UB |
| AA | AA |
| 5(a) | 5(b) |
| BA | UA |
| UA | BA |
| 6(a) | 6(b) |
| BA | UA |
| AU | AB |

Now there is only one way to place the remaining symbol (the empty slot symbol or 'E'). Table III illustrates Table II with the empty slot symbol placed.

TABLE III

| 1(a) | 1(b) |
| --- | --- |
| AA | AA |
| BE | EB |
| 2(a) | 2(b) |
| AB | AE |
| AE | AB |
| 3(a) | 3(b) |
| AB | AE |
| EA | BA |
| 4(a) | 4(b) |
| BE | EB |
| AA | AA |
| 5(a) | 5(b) |
| BA | EA |
| EA | BA |
| 6(a) | 6(b) |
| BA | EA |
| AE | AB |

Thus, Table III contains all possible ways to rearrange the hypothetical above described situation. For each arrangement, a respective payout can be determined using the available paylines and paytable. The highest paying arrangement can be selected.

An example payout structure for the above example can be that there is one winning payline (although of course more paylines can be used). The single winning payline comprises the lower left symbol and the lower right symbol and the only winning payout is "AA" pays 100 coins. Thus, the combinations with the highest payouts from Table III are 4(*a*) and 4(*b*). Since these are equal, either one can be used.

It is further noted that some arrangements may not be possible to reach if an empty slot symbol is used and symbols are rearranged according to a "15 puzzle." It is mathematically known that certain combinations may not be possible from initial combinations. For example, some arrangements in Table III may not be possible to arrive at from the initial arrangement. An embodiment may allow a rearrangement of symbols to form an impossible arrangement or alternatively impossible arrangements may not be allowed. In the latter case, a highest arrangement can be used which is possible to reach based on an initial arrangement (or in the case of multiple highest possible arrangements, one can be chosen).

Figure 11:
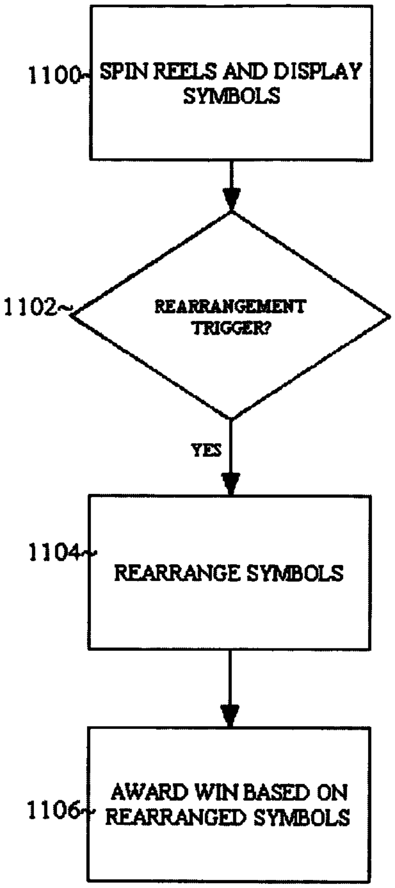
FIG. 11 is an exemplary flowchart illustrating an alternative method to award a bonus payout, according to an embodiment.

FIG. 11 is an exemplary flowchart illustrating an alternative method to award a bonus payout, according to an embodiment.

The method can begin with operation 1100, which spins reels and displays symbols. This can be accomplished as known in the art. An initial award can be awarded to the player based on the initial arrangement of symbols, as known in the art.

From operation 1100, the method can proceed to operation 1102, which determines if there is a rearrangement trigger. A rearrangement trigger can be, for example, the appearance of a rearrangement symbol.

If the check in operation 1102 determines that a rearrangement trigger is present, then the method can proceed to operation 1104, which rearranges symbols. This operation can comprises determining a second arrangement from the first arrangement (as described herein), and visually presenting the second arrangement to the player (as described herein).

From operation 1104, the method can proceed to award the win based on the second arrangement of symbols. This award can be made in addition to an award based on the first arrangement of symbols, or alternatively the first arrangement of symbols may not be paid an award.

In a further embodiment, a row or column of symbols can slide in any direction. A slide trigger can trigger the sliding, such as a special symbol which will cause the row or column that symbol is found in to slide.

FIGS. 12A-12E are exemplary slot game outputs of a successive sliding row, according to an embodiment.

Figure 12A:
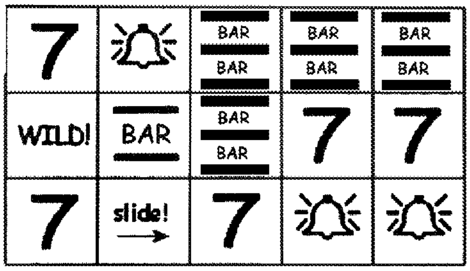
FIGS. 12A-12E are exemplary slot game outputs of a successive sliding row, according to an embodiment.

If FIG. 12A were an initial spin result, then a slide has been triggered because of the slide symbol appearing on the bottom row. This symbol can trigger a row slide, since there is an arrow pointing in a direction of the row (e.g. left or right).

Figure 12B:
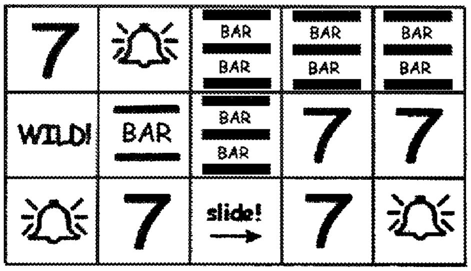

FIG. 12B illustrates a second arrangement, after the bottom row has its symbols slided one symbol to the right. Note that the end symbol that would extrude out of the symbol space after the slide can then be relocated to the first symbol in the sliding row or column. Thus, note that the bell symbol in the last position on the bottom row (from FIG. 12A) has been relocated to the first position in the bottom row in FIG. 12B. The same relocation can be performed when columns slide as well.

Figure 12C:
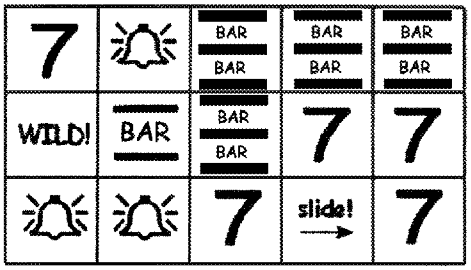

FIG. 12C illustrates a third arrangement, after the bottom row symbols have been slided a second time.

Figure 12D:
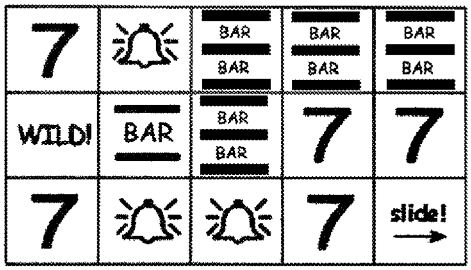

FIG. 12D illustrates a fourth arrangement, after the bottom row symbols have been slided a third time.

Figure 12E:
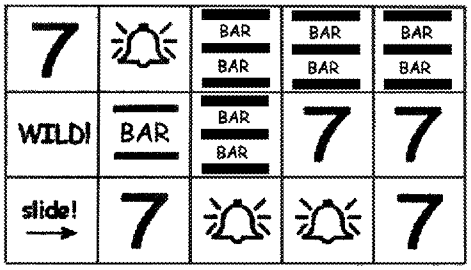

FIG. 12E illustrates a fifth arrangement, after the bottom row symbols have been slided a fourth time.

Note that all of the arrangements can each be paid, or any combination of them. Further, the sliding may be done throughout all symbol positions (e.g. 5 arrangements for a row in 5×3 machine) or some (e.g. symbols can be slided one or more times using displacements of one or more). In an embodiment, a slide trigger can trigger the symbols to slide to the highest paying arrangement possible for a row or column slide. For example, if FIG. 12A is the initial arrangement, and FIG. 12D is the highest paying arrangement out of all the slides, then the machine can slide the bottom row three times to result in the fourth arrangement which can then be paid. The initial arrangement may or may not be paid as well, depending on the embodiment being implemented.

Figure 13:
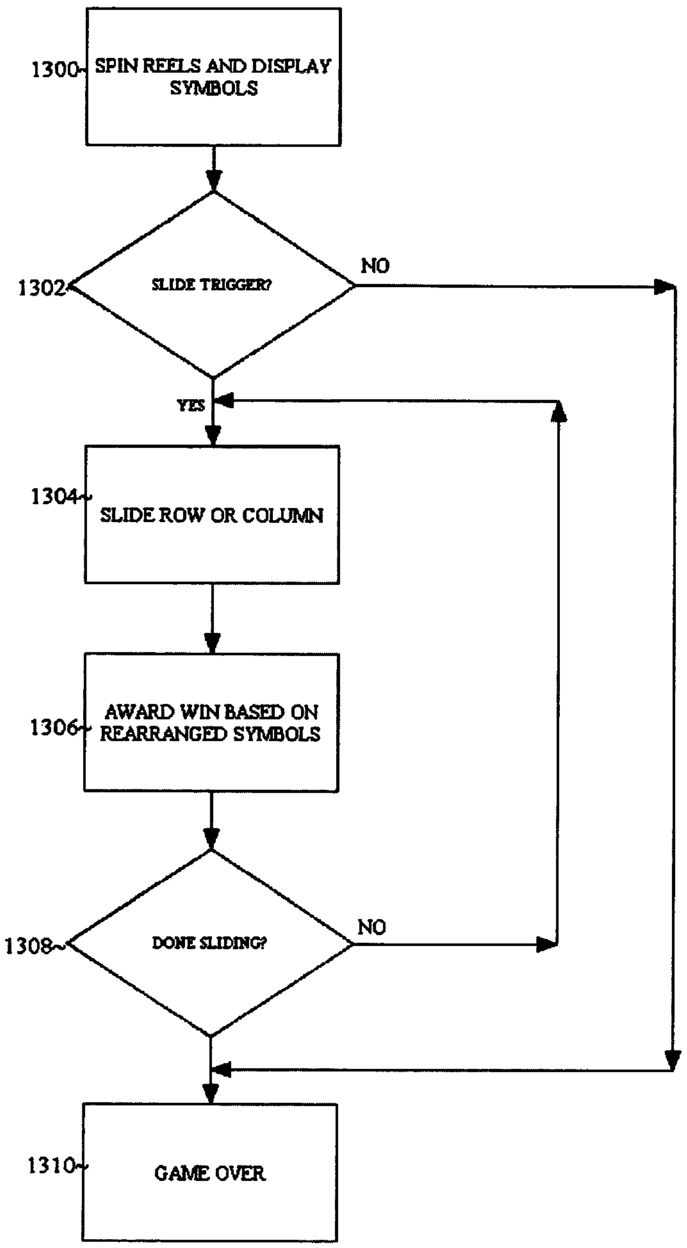
FIG. 13 is an exemplary flowchart illustrating a method to implement a sliding row or column, according to an embodiment.

FIG. 13 is an exemplary flowchart illustrating a method to implement a sliding row or column, according to an embodiment.

The method can begin with operation 1300 which spins reels and displays symbols, as known in the art.

From operation 1300, the method can proceed to operation 1302, which determines if there is a slide trigger. A slide trigger can be a particular symbol, a particular combination of symbols, a random event independent of symbols displayed, etc.

If the determination in operation 1302 determines that a slide trigger is present, then the method can proceed to operation 1304, which then slides a row or a column. The slide trigger can determine whether a row or column is slided. For example, in FIG. 12, the slide symbol contains an arrow pointing left or right, which would signify a sliding of a row, but a slide symbol can also trigger a column slide which would slide symbols vertically (but otherwise similarly to the row slide described herein).

From operation 1304, the method can proceed to operation 1306, which can award a win based on the rearranged symbols. This operation can also be optional, in that in some embodiments, not all intermediate arrangements are required to be awarded (although they can be).

From operation 1306, the method can proceed to operation 1308, which determines if the method is done sliding. For example, if a row is being slided, and all five arrangements have been displayed, then the method would typically be done, upon which the game can typically end.

If the determination in operation 1306 determines that the method is not done sliding, then the method can return to operation 1304 which continues to slide.

In yet a further embodiment, more than one row or column (or possibly all rows or columns) can be slided at a time.

FIGS. 14A-14E are exemplary slot game outputs of successive sliding rows, according to an embodiment. In this example, all rows are each slided successively to the right (as opposed to a single row in FIGS. 12A-12E).

Figure 14A:
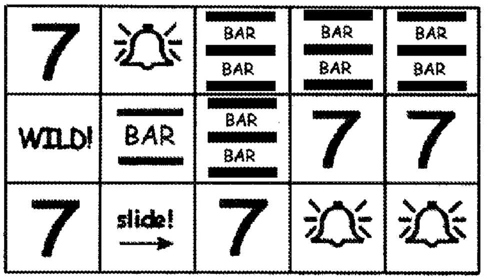
FIGS. 14A-14E are exemplary slot game outputs of successive sliding rows, according to an embodiment.

If FIG. 14A were an initial spin result, then a slide has been triggered because of the slide symbol appearing on the bottom row. This symbol can trigger a row slide, since there is an arrow pointing in a direction of the row (e.g. left or right). In this embodiment, all rows are slided.

Figure 14B:
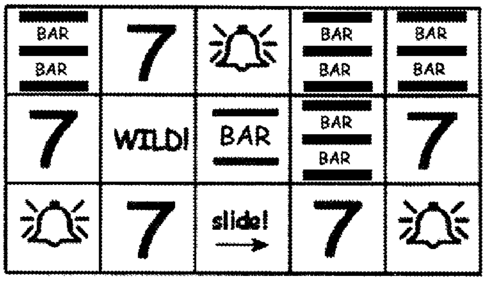

FIG. 14B illustrates a second arrangement, after all rows have their symbols slided one symbol to the right. Note that the end symbols that would extrude out of the symbol space after the slide can then be relocated to the first symbol in each respective column.

Figure 14C:
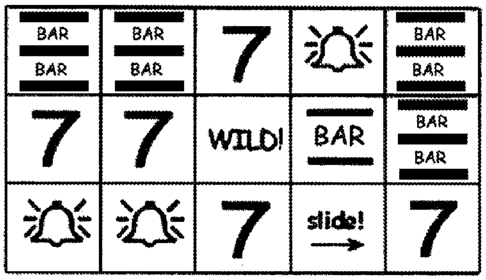

FIG. 14C illustrates a third arrangement, after all rows have their symbols slided a second time.

Figure 14D:
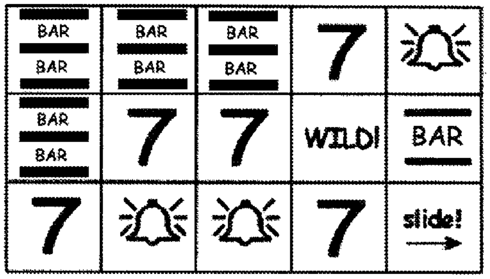

FIG. 14D illustrates a fourth arrangement, after all rows have their symbols slided a third time.

Figure 14E:
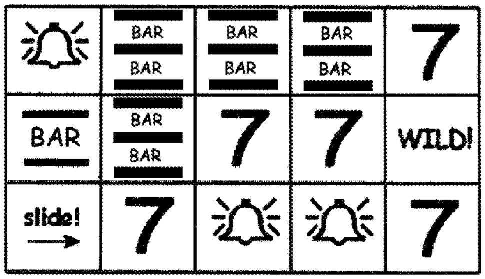

FIG. 14E illustrates a fifth arrangement, after all rows have their symbols slided a fourth time.

The multiple row/column sliding embodiment illustrated in FIGS. 14A-14E can be used with any of the other embodiments described and illustrated herein, including FIG. 13.

In a further embodiment, non-identical slot symbols can be used to form and award winning patterns. This is in contrast to a standard slot game which typically has a small number of identical symbols, which when combined, form a winning combination.

Different pieces (squares to be displayed in a slot grid) can have markings on them which can be combined to form a symbol. Each symbol can have an award amount. For example, a seven can award 50 coins, a circle can award 10 coins, and an 'X' can award 100 coins.

Figure 15:
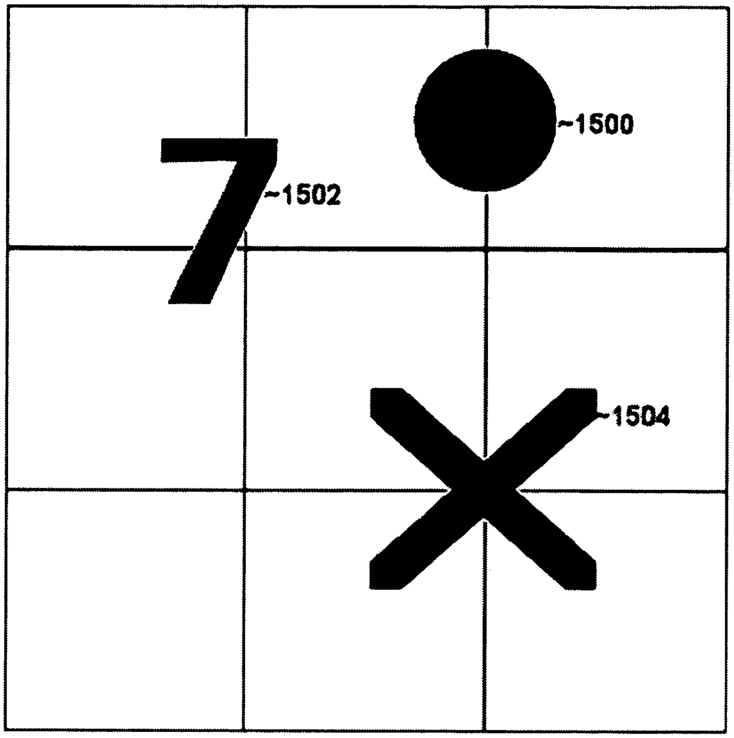
FIG. 15 is an exemplary slot game output illustrating non-identical symbols, according to an embodiment.

FIG. 15 is an exemplary slot game output illustrating non-identical symbols, according to an embodiment.

Three complete winning symbols are pictures, a circle 1500 a seven 1502, and an 'x' 1504. For these particular 9 pieces, this represents their optimal arrangement.

Figure 16:
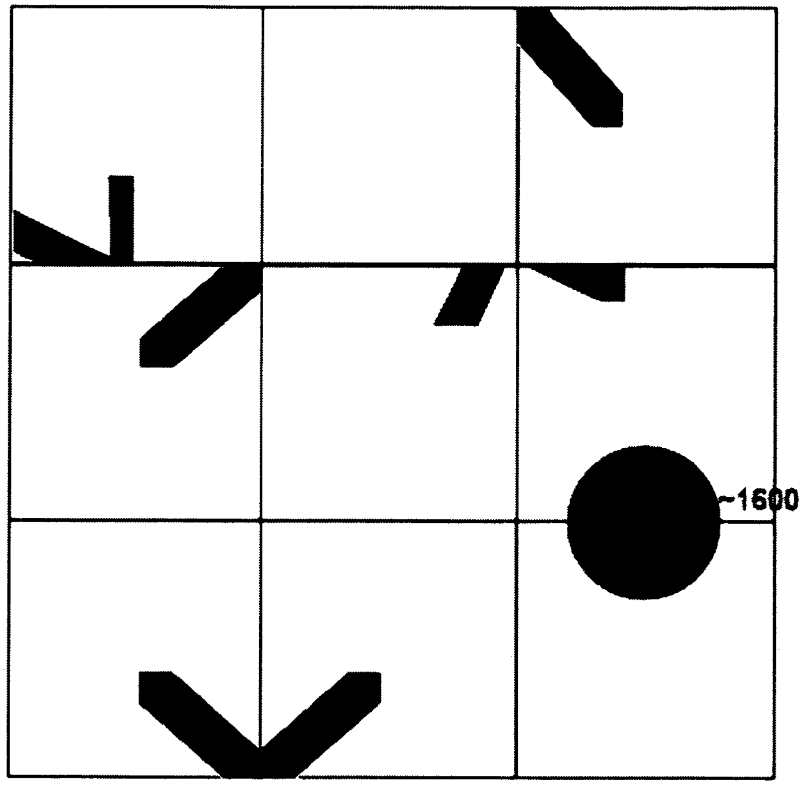
FIG. 16 is a further exemplary slot game output illustrating non-identical symbols, according to an embodiment.

FIG. 16 is a further exemplary slot game output illustrating non-identical symbols, according to an embodiment.

In this example, the same pieces from FIG. 16 are used in this grid, with some of the pieces rotated (any amount of rotation can be applied). The locations and rotation of each piece are random. In this example, there is one winning symbol, the circle 1600. If rotation is applied, then the winning symbol may be in any possible orientation (e.g. the seven symbol can be upside down, etc.)

Figure 17:
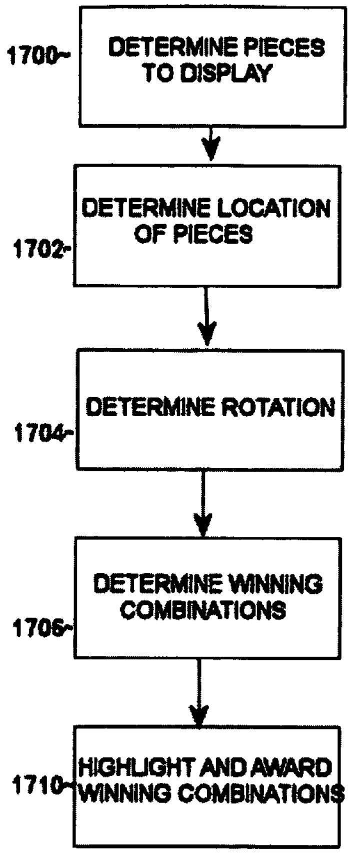
FIG. 17 is an exemplary flowchart illustrating a method to populate slot a slot matrix with non-identical symbols, according to an embodiment.

FIG. 17 is an exemplary flowchart illustrating a method to populate slot a slot matrix with non-identical symbols, according to an embodiment.

The method can begin with operation 1700, which determines which pieces to display. In one embodiment, a fixed number of pieces (e.g. 9) are available, and all such pieces can be randomly placed. In a further embodiment, a fixed number of pieces (e.g. 9, 10, 100, 1000, etc.) can be available and a subset of these pieces can be chosen at random to place in the current grid. It may be optional whether to allow duplicate pieces or not (e.g. the same piece can appear more than once vs. only once).

From operation 1700, the method can proceed to operation 1702, which determines the location of each piece. This can be done by assigning a random location on the grid for each piece which is to be displayed.

From operation 1702, the method can proceed to operation 1704, which determines a rotation of each piece. In an embodiment which does not allow for rotation, this operation is omitted. Otherwise, pieces can be given a random rotation (e.g. 0 degrees, 90 degrees, 180 degrees, or 270 degrees).

From operation 1704, the method can proceed to operation 1706, which displays the pieces based on the prior determinations and determines winning combinations. Winning combinations can be a group of pieces which combine to form a symbol, such as illustrated in FIG. 15.

From operation 1706, the method can proceed to operation 1710, which highlights any winning symbols and awards the winning symbols (combinations of pieces).

It is noted that the operations in FIG. 17 can be combined or performed in any order. For example, operations 1700 and 1702 (or 1700-1704) can be combined such that each piece can be determined one by one (e.g. a piece can be rotated and placed, then subsequent pieces can be addressed). The order and logic flow is merely exemplary, but as known in the art, the concepts therein can be performed in other orders/logic as well.

A player may pay once for a "spin" to activate the entire grid, upon which any formed symbol therein can be paid. Alternatively, paylines can be implemented wherein a player can active different rows and/or columns, upon which the player is awarded for formed symbols which appear in active paylines. For example, with the 3×3 grid illustrated in FIG. 15, 6 paylines can be used: a (top row), b (middle row), c (bottom row), d (leftmost column), e (middle column), and f (rightmost column). The player can pay to activate any or all of these paylines. If a formed symbol appears in an active payline, then the player wins the award for that symbol. For example, the circle symbol from FIG. 15 appears in paylines a, e and f. Thus, if the player bought all six paylines then the player can win the award for the circle six times.

It is also noted that any and/or all of the above embodiments, configurations, variations of the present invention described above can mixed and matched and used in any combination with one another. This also includes any prior document incorporated by reference, and any feature described herein can also be applied to any such documents. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

Further, the operations described herein can be performed in any sensible order. Any operations can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a slot machine, the method comprising:

performing the following operations on an electronic gaming machine:

providing a first winning symbol and a second winning symbol, the first winning symbol comprising a plurality of non-identical pieces that when placed together visually form the first winning symbol, the first winning symbol comprising at least two horizontally adjacent pieces and at least two vertically adjacent pieces, and the second winning symbol comprising only two non-identical pieces that when placed together visually form the second winning symbol;

providing a paytable comprising a first payout for a complete first winning symbol and a second payout for a complete second winning symbol, the first payout higher than the second payout;

receiving a wager from a player;

randomly determining and displaying in a two dimensional grid a set of pieces out of a plurality of available pieces;

identifying any present winning symbols present in the set of pieces in the grid; and awarding a payout value for the wager based on the present winning symbols in accordance with the paytable, wherein each piece is square, wherein each piece is enabled to randomly rotate a rotation selected from all of the following orientations: 0 degrees, 90 degrees, 180 degrees, and 270 degrees.

2. An apparatus, comprising:

a computer connected to a non-transitory computer readable storage;

an output device connected to the computer;

the computer readable storage configured to:

provide a first winning symbol and a second winning symbol, the first winning symbol comprising a plurality of non-identical pieces that when placed together visually form the first winning symbol, the first winning symbol comprising at least two horizontally adjacent pieces and at least two vertically adjacent pieces, and the second winning symbol comprising only two non-identical pieces that when placed together visually form the second winning symbol;

provide a paytable comprising a first payout for a complete first winning symbol and a second payout for a complete second winning symbol, the first payout higher than the second payout;

receive a wager from a player;

randomly determine and display on the output device in a two dimensional grid a set of pieces out of a plurality of available pieces;

identify any present winning symbols present in the set of pieces in the grid; and award a payout value for the wager based on the present winning symbols in accordance with the paytable, wherein each piece is square, wherein each piece is enabled to randomly rotate an orientation selected from all of the following orientations: 0 degrees, 90 degrees, 180 degrees, and 270 degrees.

* * * * *